United States Patent [19]

Yamamoto

[11] Patent Number: 5,029,676
[45] Date of Patent: Jul. 9, 1991

[54] DRUM BRAKE SELF-ADJUSTER MECHANISM

[75] Inventor: Mayjue A. Yamamoto, Livonia, Mich.

[73] Assignee: General Motors Corporation, Detroit, Mich.

[21] Appl. No.: 412,301

[22] Filed: Sep. 25, 1989

[51] Int. Cl.$^5$ ............................................. F16D 65/56
[52] U.S. Cl. ..................... 188/79.54; 188/106 A; 188/106 F; 188/196 BA; 192/111 A
[58] Field of Search ............... 188/79.51, 79.52, 79.54, 188/79.55, 106 A, 106 F, 196 BA; 192/111 A

[56] References Cited

U.S. PATENT DOCUMENTS

| | | | | |
|---|---|---|---|---|
| 3,706,360 | 12/1972 | Nyunoya | ........................... | 188/29.54 |
| 3,963,100 | 6/1976 | Kaub | ........................... | 188/79.54 |
| 4,101,010 | 7/1978 | Burnett | ........................... | 188/79.54 |
| 4,220,227 | 9/1980 | Kluger | ........................... | 188/196 BA |
| 4,588,052 | 5/1986 | Courbot | ........................... | 188/196 BA |

FOREIGN PATENT DOCUMENTS 2257520 11/1973 Fed. Rep. of Germany ...... 188/196 BA
1191320 5/1970 United Kingdom ............. 188/79.54

Primary Examiner—George E. A. Halvosa
Attorney, Agent, or Firm—Ernest E. Helms

[57] ABSTRACT

A self-adjuster for a drum brake of the leading-trailing or duo servo type having the adjuster lever mounted on one of the brake shoe webs and engaged in as separate slot on the spreader and adjuster strut from the slot in which a brake shoe web and a parking brake actuating lever are received, preventing the adjuster lever from being jammed by the brake shoe web or the parking brake actuating lever. The pivot point for the adjuster lever is the same as that for the parking brake actuating lever, and is a pin mounted on the brake shoe web which is received in the other adjuster strut slot with the parking brake lever.

1 Claim, 1 Drawing Sheet

DRUM BRAKE SELF-ADJUSTER MECHANISM

FIELD OF THE INVENTION

The invention relates to a mechanical self-adjuster mechanism for drum brakes, and more particularly to one in which an adjuster lever is pivoted coaxially with the parking brake lever on the web of the trailing or secondary brake shoe.

BACKGROUND OF THE INVENTION

It has been common practice for some years, particularly with leading-trailing drum brakes, to pivot an adjuster lever on the web of the leading brake shoe and to position it beside the web in the same slot formed in one end of the spreader and adjuster strut in which the web is received. This places the adjuster mechanism at the opposite end of the strut from the parking brake actuating lever, which is usually pivotally mounted on the web of the trailing brake shoe. This arrangement thus requires two separate pivot arrangements on the shoe webs, one on one shoe web for the parking brake actuating lever and one on the other shoe web for the adjuster lever. When the adjuster lever is received within the same slot as the web of the shoe on which it is pivotally mounted, it is subject to possible jamming and resultant insufficient adjusting action.

SUMMARY OF THE INVENTION

The adjuster lever is pivoted coaxially with the parking brake lever on the web of the trailing or secondary brake shoe, requiring only one pivot arrangement on only one brake shoe. The combined parking brake and adjuster strut is bifurcated at one end to receive the leading or primary brake shoe in its slot, and is trifurcated at the other end to receive the web of the trailing or secondary brake shoe and the parking brake apply lever in one slot and the adjuster lever in the other slot. The adjuster lever spring is laterally offset from the pawl and the point of engagement with the adjuster lever in the separate slot of the adjuster strut so that a component of spring force urges the adjuster lever in a lateral pivotal manner around the point of engagement of the adjuster lever with the adjuster strut at the bottom of the separate slot, continually urging the pawl portion of the adjuster lever into engagement with the star wheel forming a part of the adjuster strut. This arrangement of elements prevents the adjuster lever from being subject to possible jamming and resultant insufficient adjusting action as may be the case when the adjuster lever is received within the same slot as the web of the shoe on which it is pivotally mounted.

DETAILED DESCRIPTION

Figure 1:
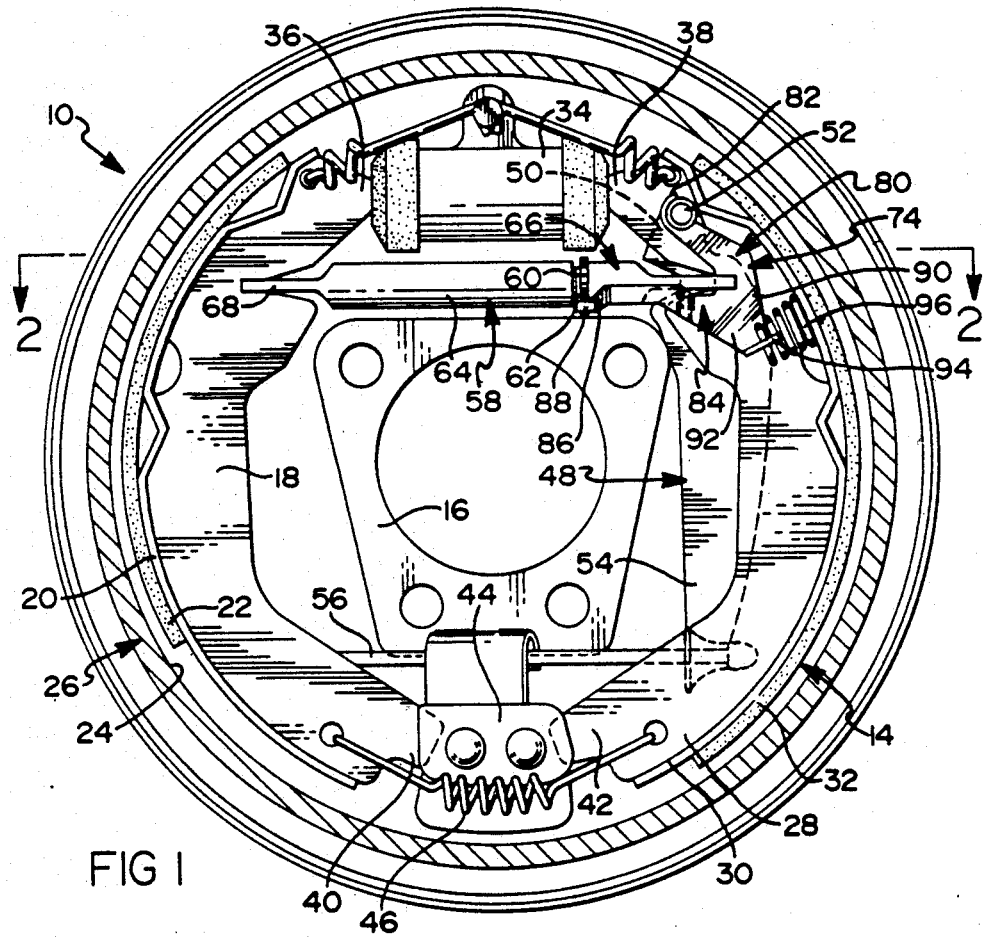
FIG. 1 is a side elevation view of a drum brake embodying the invention, with parts shown in section.

The particular drum brake assembly 10 shown in the drawing is a leading-trailing type brake. However, the invention is also adapted to be used with a duo servo brake. Such a brake would have a movable strut joining the lower ends of the shoes, but it would not be an adjuster strut as is usually used in such brakes.

In the leading-trailing brake shown, the leading brake shoe assembly 12 and the trailing brake shoe assembly 14 are suitably mounted on the backing plate 16 for movements generally parallel to the backing plate The shoe mounting arrangement is not illustrated, but may be any of several types well known in the art.

Shoe assembly 12 has a shoe web 18, a shoe rim 20 and a friction braking lining 22 mounted on the rim for braking engagement with the braking surface 24 of the brake drum 26 when the brake is actuated. Shoe assembly 14 has a similar construction, comprising the shoe web 28, shoe rim 30 and friction braking lining 32. A wheel cylinder 34, adapted for hydraulic pressure actuation, is mounted on the backing plate 16 so that the upper adjacent ends 36 and 38 of shoe webs 18 and 28, respectively, engage the wheel cylinder pistons in a manner well known in the art. The lower adjacent ends 40 and 42 of shoe webs 18 and 28, respectively, engage the anchor 44. Anchor 44 is fixed to the backing plate substantially opposite the wheel cylinder 34. A tension spring 46 is secured to shoe web ends 40 and 42 so as to continually urge them into engagement with the anchor 44.

A parking brake lever 48 is pivotally mounted at its upper end 50 on pivot 52, located on shoe web 28 near web end 38. The parking brake lever 48 extends along one side of the shoe web. The parking brake lever's lower end 54 is located near the shoe web end 42 and is arranged to be connected with the parking brake actuating cable 56.

Figure 2:
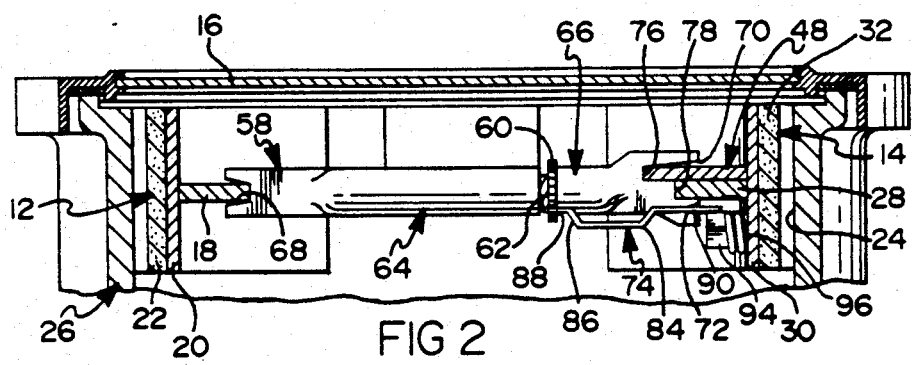
FIG. 2 is a cross section view of the drum brake of FIG. 1, taken in the direction of arrows 2—2 of that Figure, with parts broken away.

A combination parking brake apply and brake adjusting strut 58 is positioned near the wheel cylinder so that its opposite ends engage the brake shoe webs and the parking brake lever as better seen in FIG. 2. Strut 58 has a star wheel 60 on an adjuster screw 62 which has a threaded end extending into the internally threaded strut part 64. It also has a round end extending into the other strut part 66 so that it can be rotated relative to that strut part. When the star wheel is moved arcuately, its adjuster screw 62 is threaded into or out of strut part 64, lengthening the strut for brake adjustment or shortening the strut when the adjustment is being manually reset The outer end of strut part 64 is bifurcated to form a slot 68 which receives the shoe web 18 therein as shown in FIG. 2. To this extent, strut 58 is similar to other such struts well known in the brake art.

The outer end of strut part 66 is trifurcated, having a first slot 70 which receives both the shoe web 28 and the parking brake lever 48, and a second slot 72 which is positioned adjacent slot 70 and receives the adjuster lever 74. Slot 70 has a stepped bottom, defined by steps 76 and 78, so that the parking brake lever 48, being wider, is in the deeper portion of the slot and engages the step 76, while the shoe web 28 is in the less deep part of the slot and is engageable with the step 78.

The adjuster lever 74 is generally V-shaped as seen in FIG. 1, with one leg 80 having an end 82 in pivotal engagement with the pivot 52. The other leg 84 has an end 86 which is formed to provide a pawl 88 which engages the star wheel 60 and causes that wheel to rotate during adjusting action as needed to maintain the desired adjustment of the brake shoes. The other leg 84 has a part bent outwardly away from the strut 58 and then runing parallel to but spaced from the surface of the parking brake lever so that the parking brake lever is pivotally movable during application and release of the parking brake without engaging the adjuster lever 74. The inner portion 90 of lever leg 80. adjacent to the center portion 92 of the lever 74 where the two legs 80 and 84 join together, is the part of lever 74 which is received in the strut slot 72. The lever center portion 92 has a tab 94 bent transversely outward from lever portion 92 and extending toward shoe rim 30 so as to form a spring retainer and guide. One end of a coil compression spring 96 surrounding fits over the tab 94 so that the spring is retained and guided, with the other end of the spring being seated on the rim 30. Spring 96 continually urges the lever 74 in a clockwise pivotal direction, as viewed in FIG. 1, which results in positionally capturing the lever end 82 in engagement with the pivot 52 and the inner portion 90 of lever leg 80 in engagement with the bottom of slot 72.

When the brake is actuated by the wheel cylinder 34, the upper ends 36 and 38 are spread apart and brake shoe assemblies 12 and 14 are moved outwardly, pivoting about their lower ends 40 and 42 on anchor 44, so that their brake linings 22 and 32 engage the drum braking surface 24 in braking relation. Strut 58 remains at or near the position shown in the drawing, with the shoe webs 18 and 28 moving partially out of their respective strut slots 68 and 70. Thus pivot 52 moves outward, which is to the right as seen in FIG. 1, and spring 96 causes the adjuster lever 74 to pivot clockwise slightly about the bottom of its strut slot 72. This will cause pawl 88 to move upwardly slightly relative to star wheel 60. So long as there is insufficient brake lining wear to require adjustment, pawl 88 does not move sufficiently far to pass over and engage the next tooth of the star wheel. If the brake lining has worn enough to require adjustment, the pawl 88 will move until it passes over and engages the next star wheel tooth. Upon brake release, as shoe assembly 14 is moved back toward the position shown in FIG. 1 by its retraction spring, pivot 52 is moved leftwardly as seen in FIG. 1, forcing the adjuster lever 74 to pivot counterclockwise about the bottom of strut slot 72. This forces the pawl 88 downwardly, moving the star wheel 60 arcuately and turning the adjuster screw 62 to slightly increase the effective length of the strut 58. This prevents the brake shoe assemblies 12 and 14 from moving as far inward as before, and establishes a slightly different released position of the brake shoes which maintains the desired clearance between the braking surfaces of the brake linings 22 and 32 relative to the braking surface 24 of the brake drum.

When the brake assembly 10 is actuated in the parking brake mode, cable 56 is tensioned and parking brake lever 48 is pivoted clockwise about pivot 52 as seen in FIG. 1. Due to engagement of the parking brake lever 48 with strut 58 at slot bottom portion 78, parking brake actuating force is transferred to brake shoe assembly 12 through the strut, and both brake shoe assemblies are moved outwardly until their linings 22 and 32 engage the drum braking surface 24 in braking relation. Lever 74 pivots as before, and pawl 88 moves over and engages the next tooth of star wheel 60 if the lever 74 pivots sufficently, positioning the pawl for its adjusting action on the star wheel upon brake release. When the parking brake is released, the same adjusting action takes place as above described.

The construction embodying the invention therefore adjusts the brake assembly upon brake release, whether in the service braking or parking brake mode of operation. The adjuster lever is not subjected to any interference with a shoe rim or a parking brake apply lever by reason of its having its own slot in the end of the sreader and adjusting strut. It therefore is not adversely affected by movements of the shoe rim and the parking brake apply lever, and is more free to function properly than is often the case when it is positioned in the same slot with either a shoe rim or a parking brake apply lever.

The embodiments of the invention in which an exclusive property or privilege is claimed are defined as follows:

1. In a drum brake assembly having a rotatable drum to be braked, a first brake shoe assembly and a second brake shoe assembly, a spreader strut joining said shoe assemblies, means for actuating and releasing the shoe assemblies in service braking mode, and a parking brake actuating lever pivotally mounted on the second brake shoe assembly and engaging one end of the spreader strut so that upon pivotal parking brake actuating movement of the actuating lever braking force is transmitted through the spreader strut to the first brake shoe assembly, moving both brake shoe assemblies into braking relation with the drum, and upon pivotal parking brake releasing movement of the actuating lever braking force acting on the shoe assemblies is released to release the brake assembly from the parking brake actuated mode, the improvement comprising:

said spreader strut having an adjuster screw and toothed star wheel for rotation of said screw to change the effective length of said spreader strut, one strut end being bifurcated to define a first slot receiving said first brake shoe assembly shoe web therein, and the other strut end being trifurcated to define second and third slots, said second slot having fist and second stepped bottoms with said second brake shoe assembly shoe web being received therein and engaging said second slot first stepped bottom and said parking brake actuating lever also being received therein and engaging said second slot second stepped bottom;

an adjuster lever having a center section and first and second legs each of which has an outer end and an inner end, said leg inner ends joining as said center section, said outer end of said first leg pivotally engaging the pivot of said parking brake actuating lever in force transmittable relation and said inner end of said first leg fitting in said third slot and engaging the bottom thereof in pivotal and force transmittable relation, said adjuster lever second leg outer end having a pawl formed thereon in engaging and drivable relation with said star wheel, said adjuster lever center section having a tab transversely bent therefrom and extending toward the rim of said second brake shoe assembly to form a spring retainer and guide, and a compression spring having one end surrounding said tab so as to be retained and guided thereby, the other spring end operatively engaging the rim of said second brake shoe assembly so that said spring urges said lever center section away from the second brake shoe assembly rim and urges said lever first leg into force transmittable engagement with said third slot bottom on said spreader strut and with said pivot capturing said adjuster lever in position;

said adjuster lever upon service or parking brake actuation being pivoted in a direction tending to move said pawl over and into engagement with another tooth of said star wheel, and so being moved when there is sufficient brake applying movement of said second brake shoe assembly to indicate the need for brake adjustment, said adjuster lever upon brake release being pivoted in the other direction so that when said pawl has moved over another tooth of said star wheel said pawl forces said star wheel to move and rotate said adjusting screw to cause said strut to effectively increase its length and decrease the brake shoe retraction distance permitted said brake shoe assemblies and thereby cause said brake assembly to be adjusted for brake lining wear.

* * * * *